United States Patent [19]

Duranel et al.

[11] Patent Number: 5,192,732
[45] Date of Patent: Mar. 9, 1993

[54] PROPYLENE POLYMERIZATION COCATALYST CONTAINING SILANE AND RESULTANT CATALYSTS

[75] Inventors: Laurent Duranel, Arthez de Bearn; Roger Spitz, St Syphorien d'Ozon; Thierry Soto, Lyons, all of France

[73] Assignee: Atochem, France

[21] Appl. No.: 798,235

[22] Filed: Nov. 22, 1991

[30] Foreign Application Priority Data

Nov. 27, 1990 [FR] France ................. 90 14800

[51] Int. Cl.$^5$ ............................. C08F 4/656
[52] U.S. Cl. ...................... 502/126; 502/125; 502/127; 526/125
[58] Field of Search ............ 502/125, 126, 127

[56] References Cited

U.S. PATENT DOCUMENTS

| | | | |
|---|---|---|---|
| 4,814,314 | 3/1989 | Matsuura et al. | 502/127 X |
| 4,829,038 | 5/1989 | Hoppin et al. | 502/125 |
| 5,023,223 | 6/1991 | Ebara et al. | 502/127 X |
| 5,066,737 | 11/1991 | Job | 502/125 X |
| 5,077,357 | 12/1991 | Job | 502/127 X |
| 5,082,907 | 1/1992 | Job | 502/127 X |

FOREIGN PATENT DOCUMENTS

| | | |
|---|---|---|
| 0349772 | 1/1990 | European Pat. Off. |
| 0373999 | 6/1990 | European Pat. Off. |
| 0385765 | 9/1990 | European Pat. Off. |
| 3633131 | 3/1988 | Fed. Rep. of Germany |

*Primary Examiner*—Patrick P. Garvin

[57] ABSTRACT

A cocatalyst for use in association with a catalytic component comprising a titanium compound and an internal electron donor on a magnesium halide support for the polymerization of propylene alone or propylene with ethylene or a $C_4$ to $C_{12}$ alpha-olefin, said cocatalyst consisting essentially of an organic aluminum compound and an external electron donor consisting essentially of a non-aromatic silane with two Si—O—C bonds and a monoether and/or a silane with a single Si—O—C bond and the resultant catalyst wherein such cocatalyst is combined with a catalytic component known for use in polymerizing propylene.

15 Claims, No Drawings

PROPYLENE POLYMERIZATION COCATALYST CONTAINING SILANE AND RESULTANT CATALYSTS

BACKGROUND OF THE INVENTION

The present invention pertains to a cocatalyst employed in association with a catalytic component in the polymerization of propylene. The customary aluminum compound cocatalyst is associated with a mixture functioning as an external electron donor, which mixture is comprised of at least two organic compounds one of which is a silane with two Si—O—C bonds and the other is a compound with a single C—O—C bond and/or a single Si—O—C bond. The present invention also pertains to catalytic systems for the polymerization of propylene comprising such cocatatalyst and a catalytic component.

In a known manner, the Ziegler-Natta catalytic system is comprised of two indissociable elements, a transition metal catalytic component and a cocatalyst which is generally an aluminum compound. An electron donor or other elements can be added to the catalytic component.

EP 45976 and EP 45977 describe catalytic systems constituted of a solid Ti, Mg, and Cl catalytic component and a cocatalyst formed of an aluminum compound and an organic silane with at least one Si—O or Si—N bond. Practical experience has shown that not all silanes corresponding to this definition yield the desired results. For example, with certain of these silanes the catalytic productivity as well as the stereoselectivity are low or even very poor.

Among the large number of known nonaromatic silanes, those with two Si—O—C bonds produce good results, i.e., they result in the industrial production of polypropylene with high crystallinity or of copolymers with high mechanical performance such as statistical copolymers or copolymers with high impact resistance.

Japanese Patent 61-23802 also described an olefin polymerization catalyst constituted of a catalytic component (a) comprising magnesium chloride, an internal electron donor, a halogenated titanium compound, and a cocatalyst (b) comprising an aluminum alkyl, an organic carboxylic ester and a silane, with these last two substances being external electron donors.

Finally, Japanense Patent 60-11924 describes an olefin polymerization catalyst comprising on the one hand a catalytic component (a) containing a magnesium compound, an internal electron donor that can be an ether, a chlorosilane that also functions as an internal electron donor, a halogenated titanium compound and a final internal electron donor in the form of a car boxylic ester, and on the other hand a cocatalyst (b) constituted of an aluminum alkyl and an alkoxy-silane as external electron donor.

The advantage of introducing silane as an external electron donor in Ziegler-Natta catalytic system is to increase the activity and productivity of these systems. However, there is a considerable economic disadvantage since silanes are costly products.

SUMMARY OF THE INVENTION

The object of the invention is a selective combination of two electron donors, one of which is selected from the family of monoethers and/or silanes with a single Si—O—C bond, and the other of which is selected from the family of nonaromatic silanes with two Si—O—C bonds. This association is employed as an external electron donor in association with an organic aluminum compound used as cocatalyst component in the propylene polymerization catalytic system.

DETAILED DESCRIPTION

This selective combination makes it possible to use a monoether and/or a silane with a single Si—O—C bond to replace a portion of the silane with two Si—O—C bonds, that is normally used alone. The result of this replacement is not only to reduce the cost of the catalytic system, but also to preserve or even improve the properties of the silane-based catalytic system by a given amount for a given result. In addition, this mixture makes it possible to decrease the consumption of solid catalytic component for a given production of a polymerization operation due to the increased catalytic activity.

The effects of this combination are unexpected for a number of reasons. One of the principal reasons is that the monoethers and silanes, employed individually or in nonselective mixtures as external electron donors in catalytic systems for the polymerization of propylene, lead to polymer productivities that are lower than those attained when they are associated in accordance with the invention. It is inexplicable that the synergy between the selected compounds provides greater productivity of the catalytic system than the productivity obtained when they are used individually.

Another reason pertains to the heptane index (HI). This index defines the proportion of polymer that is insoluble in boiling heptane. The index is determined by extraction of the fraction that is soluble in boiling heptane during two hours in a Kumagawa apparatus. In the case of a homopolymer, the HI value corresponds to the weight percent of isotactic polymer contained in the crude polymer. In the case of the polymerization of propylene, it is known that the use of a monoether and/or a silane with a single Si—O—C bond as external electron donor results in the production of polymer with very poor isotacticity with an excessively low HI. In contrast, when a silane is used alone the HI value is good. Therefore, under these conditions, there should be a drop in the index when combining as external electron donors a monoether and/or a silane with a single Si—O—C bond and a nonaromatic silane with two Si—O—C bonds. On the contrary, it has been found that the HI remains essentially at the level obtained for a polymer produced with a catalytic system employing silane alone as external electron donor.

Finally, the melt index (MI) of the final polymer increases in relation to the proportion of monoether and/or silane with a single Si—O—C bond employed as external electron donor in the catalytic system. Although the MI is higher than that obtained for polymers produced with silane alone as external electron donor in the catalytic system, the MI remains with the usually recommended commercial values: on the order of 1 to 40. The MI is measured according to ASTM Standard D 1238 method L.

The result of this increase in the MI is manifested in the context of polymerization by a decrease in the consumption of hydrogen, which is generally employed as a transfer agent. This element is not negligible on the technical and/or economic level.

In accordance with the invention, the monoether and/or the aromatic silane with a single Si—O—C bond is associated with the nonaromatic silane with two Si—O—C bonds in respective molar percentages from 80 to >0 L and from 20 to <100. Although it is possible to use less than 5 mol.-% of monoether and/or silane with a single Si—O—C and the effects of the mixture with the silane with two Si—O—C bonds on the polymerization and the polymers will still be observable, the economic value is not justified. Therefore, the recommended molar combination is from 80 to 5 mol.-% of monoether and/or silane with a single Si—O—C bond and from 20 to 95 mol.-% of silane with two Si—O—C bonds and more particularly from 75 to 30 mol.-% and from 25 to 70 mol.-%, respectively. The association of the monoether and/or silane with a single Si—O—C bond with a nonaromatic silane with two Si—O—C bonds is implemented as external electron donor under the conditions and in the amounts that are customary in the employment of external electron donors. The total amount of the combination of the monoether and/or silane with a single 5 Si—O—C bond and the silane with two Si—O—C bonds is defined by the molar ratio of the monoether and/or silane with a single Si—O—C bond + the silane with two Si—O—C bonds to the aluminum of the cocatalyst to be between 0.2 and 0.0005 or, better, between 0.1 and 0.01.

The monoether employed in accordance with the invention can be illustrated by the formula R'OR", in which R' and R" are identical or different straight or branched chain hydrocarbon radicals, preferably saturated, containing from 1 to 12 carbon atoms, preferably from 1 to 6 carbon atoms. The monoether can also be cyclic with the oxygen forming a ring with at least 4 but no more than 12 carbon atoms; it is not excluded that certain carbon atoms of the ring are linked to substituent hydrocarbon radicals in which case the total number of carbon atoms of the cyclic ether shall not exceed 16. The following can be cited from the family of monoethers: diethyl ether, di-n-propyl ether, diisopropyl ether, diisobutyl ether, methyl isobutyl ether, methyl tertiobutyl ether, ethyl-n-propyl ether, ethyl isopropyl ether, ethyl-n-butyl ether, ethyl tertiobutyl ether, tetrahydrofuran, methyl-2- tetrahydrofuran, tetrahydropyran, methyl-3-tetrahydropyran, di-n-octyl ether, diphenyl ether and diisooctyl ether.

The silane with a single Si—O—C bond employed in accordance with the invention can be illustrated by the formula:

$R_1R_2R_3Si{-}O{-}R$ in which $R_1$, $R_2$, $R_3$ are identical or different saturated or unsaturated, straight or branched chain hydrocarbon radicals containing from 1 to 12 carbon atoms and R is a methyl or ethyl radical.

Among these silanes, the following can be cited: trimethylmethoxysilane, trimethylpropoxysilane, trimethyl-t-butoxysilane, trimethylethoxysilane, diphenylmethylethoxysilane, diphenylvinylethoxysilane, dimethylvinylethoxysilane, triphenylmethoxysilane and diphenyl-t-butylmethoxysilane.

The nonaromatic silane with two Si—O—C bonds employed in accordance with the invention can be illustrated by the formula:

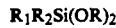

$R_1R_2Si(OR)_2$ in which $R_1$ and $R_2$ are identical or different, straight or branched saturated hydrocarbons radicals without heteroatoms containing from 1 to 12 carbon atoms and R is the methyl or ethyl radical.

The following can be cited among these silane: di-n-propyl-dimethoxysilane, di-n-propyldiethoxysilane, di-n-butyl-dimethoxysilane, di-n-diethoxysilane, diisopropyl-dimethoxysilane, diisopropyl-diethoxysilane, diisoamyl-dimethoxysilane, diisoamyl-diethoxysilane, diisooctyl-dimethoxysilane, isooctylmethyl-dimethoxysilane, isohexylmethyldiethoxysilane, cyclohexylmethyl-dimethoxysilane and norbornylmethyl-dimethoxysilane.

In accordance with the invention, the monoether and/or the silane with one Si—O—C bond and the silane with two Si—O—C bonds are associated in the catalytic system with the catalytic component and the cocatalyst as external electron donors at the beginning of the polymerization reaction at the latest. In no case should the monoether be brought into contact with the catalytic component without the presence of the cocatalyst in the medium. Preferentially, with the knowledge that electron donors generally form an association complex with the cocatalyst, it is recommended, prior to bring the cocatalyst into contact with the catalytic component, that the complex be formed by mixing the cocatalyst with the external electron donors which have possibly first been mixed with each other.

The organoaluminum cocatalyst has been known for a long time. It is usually selected from among the organoaluminum compounds such as aluminoxanes, aluminosiloxanes, compounds with Al—R—Al bonds in which R represents an alkyl group, compounds of formula $AlX_qR's$ in which X represents Cl or OR' in which R' designates a $C_1$ to $C_{16}$ alkyl radical while q and s are numbers such that $1<s<3.0<q<2$ with $q+s=3$. The following can be cited as examples: $Al(C_2H_4)_3$, $Al(C_2H_5)_2Cl$, $Al(C_4H_9)_3$, $Al_2(C_2H_5)_3Cl_3$, $Al(C_6H_{13})_3$, $Al(C_8H_{17})_3$ and $Al(C_2H_5)_2OC_2H_5)$.

The catalytic component is also known. It is generally a solid component comprising a titanium compound and an internal electron donor supported on a magnesium halide, usually $MgCl_2$, in active form. Examples of these components are described in British Patent 1,559,194 and Belgian Patent 868,682. The catalytic components that can be used in accordance with the invention may contain any known electron donor, however, preference is given to catalytic components in which the internal electron donor is an ester selected from among the compounds in the following groups:

(i) the mono- and polyesters of unsaturated polycarboxylic acids in which two carboxyl groups are connected by a double bond in the vicinal position and in which at least one of the hydrocarbon radicals $R_4$ of the $COOR_4$ groups is a saturated or unsaturated branched chain radical with 3 to 20 carbon atoms or an aryl or arylalkyl radical with 6 to 20 carbon atoms;

(ii) the mono-and diesters of aromatic dicarboxylic acids with COOH groups in the ortho position in which the hydrocarbon radical of the COOR group contains from 1 to 20 carbon atoms;

(iii) the mono-and polyesters of aromatic compounds which at least two hydroxyl groups in the ortho positions; or (iv) the esters of the aromatic hydroxylated acids in which at lest one hydroxyl group is in the position ortho to the carboxyl group.

Among these esters, the preferred compounds are the esters of maleic, fumaric, benzoic, methyacrylic and, especially, phthalic acid.

The catalytic component and the cocatalyst are associated for the polymerization of propylene in proportions such that the molar ratio of the aluminum contained in the cocatalyst to the titanium of the catalytic component is between 0.5 and 2,000 and preferably between 1 and 1,000.

The object of the invention applies to the polymerization of propylene. The polymerization of propylene is understood to also mean the copolymerization of propylene with ethylene or a $C_4$ to $C_{12}$ or, more particularly, a $C_4$ to $C_6$ alpha-olefin to the extent that propylene represents at least 75 mol.-% of the totality of the monomers employed in the case of ordered high-content copolymers.

Polymerization or copolymerization of propylene by means of the previously defined catalytic system can be performed in solution or in suspension in an inert liquid medium, notably in an aliphatic hydrocarbon such as n-heptane, n-hexane, isohexane or isobutane, or in bulk in at least one of the olefins to be polymerized maintained in the liquid or hypercritical state.

The operating conditions, notably temperatures, pressures, amount of catalytic system, for these liquid-phase polymerizations are those which are usually employed for similar cases employing conventional Ziegler-Natta catalytic systems.

For example, for polymerization performed in suspension or in solution in an inert liquid medium, it is possible to operate at temperatures up to 250° C. and under pressures ranging from atmospheric pressure to 250 bars. In the case of polymerization in liquid propylene medium, the temperatures can be as high as the critical temperature and the pressures can be between atmospheric pressure and the critical pressure.

The catalytic system obtained by association of the catalytic component, the organic aluminum compound and the selective combination of external electron donors as previously defined, can also be employed for the gas-phase polymerization of propylene or its mixtures with at least one of the other previously cited olefins. Specifically, it is possible to perform polymerization in the gas-phase, in contact with the said catalytic system, of a mixture of propylene and one or more $C_2$ to $C_{12}$ olefins, such as ethylene, butene-1, hexene-1, methyl-4-pentene-1 and octene-1, containing when it is in contact with the catalytic system a molar proportion of $C_2$ to $C_{12}$ comonomers between 0.1 and 25%, preferably between 1 and 20%.

Gas-phase polymerization of the olefin(s) in contact with the catalytic system can be performed in any gas-phase polymerization reactor and particularly in an agitated and/or fluidized bed reactor. The conditions for performing gas-phase polymerization, notably temperature, pressure, injection of the olefin(s) into the agitated bed and/or fluidized bed reactor, control of temperature and pressure, are similar to those shown in the prior art for gas-phase polymerization of olefins. Operations are generally carried out at a temperature lower than the melting point MP of the polymer or copolymer to be synthesized, and more particularly between +20° C. and (MP-5)°C., and under a pressure such that the olefin(s) and possibly the other hydrocarbon monomers present in the reactor are essentially in vapor phase.

Polymerization in solution, suspension, bulk or in gas phase can be carried out in the presence of a chain-transfer agent so as to control the melt index of the polymer or copolymer to be produced. The preferred chain-transfer agent is hydrogen, which is used in an amount up to 90%, preferably between 0.1 and 60%, of the volume of the totality of the olefins and hydrogen introduced into the reactor.

The catalytic system can also be used for preparation of an active prepolymer. The said active prepolymer is obtained by bringing propylene, or one of its mixtures as previously defined, into contact with the catalytic system in proportions such that the olefin(s) represent 2 to 500 grams, preferably 2 to 200 grams, per gram of the catalytic component of the catalytic system.

The invention will be further described in connection with the following examples which are set forth for purposes of illustration only.

EXAMPLES 1 TO 34

A series of thirty-four tests were carried out in which 1.5 Nl of hydrogen and 6 liters of liquid propylene were introduced into an 8-liter stainless steel reactor that was purged with nitrogen.

To 20 ml of a solution of triethylaluminum (TEA) in heptane at the concentration of 3 moles/liter were added a mixture of silane with two Si—O—C functions ($E_1$) and monoether or silane with a single Si—O—C function ($E_2$) in the desired molar ratio TEA/($E_1+E_2$). The mixture prepared in this manner was allowed to stand for 10 minutes at room temperature under agitation. It as then injected into the reactor. Contact was allowed to continue for 10 minutes at room temperature under agitation.

70 mg of a catalytic component comprising Mg, Cl, Ti and dibutyl phthalate produced in a known manner by impregnation of dibutyl phthalate and then $TiCl_4$ on magnesium chloride activated by grinding, the percentage by weight of Ti, Mg and Cl being 3, 16 and 56%, respectively, was injected into the reactor in the form of a suspension in 10 mL of heptane.

The temperature was brought to 70° C. over 10 minutes and the reaction was allowed to continue for 1 hour. The temperature was then reduced to room temperature while degassing the reactor.

The other conditions and the results obtained are presented in the following table. Examples 16 to 25 and 32 to 34 are presented for comparative purposes.

| Example | $E_1$ | $E_2$ | mol. % $E_2$ | Al / ($E_1 + E_2$) | P | HI | MI |
|---|---|---|---|---|---|---|---|
| 1 | CMDMS | DEE | 50 | 20 | 26,000 | 96.5 | 8.0 |
| 2 | CMDMS | DEE | 70 | 20 | 24,100 | 96.2 | 11.0 |
| 3 | CMDMS | EDIA | 70 | 20 | 17,600 | 96.2 | 14.0 |
| 4 | CMDMS | ETBE | 70 | 20 | 25,000 | 96.5 | 8.8 |
| 5 | CMDMS | MTBE | 50 | 10 | 27,400 | 97.5 | 6.2 |
| 6 | CMDMS | MTBE | 70 | 10 | 25,400 | 96.8 | 7.4 |
| 7 | CMDMS | MTBE | 80 | 10 | 23,800 | 95.0 | 10 |
| 8 | CMDMS | MTBE | 30 | 10 | 22,700 | 97.6 | 5 |
| 9 | DBDMS | DEE | 50 | 10 | 23,500 | 96.8 | 7 |
| 10 | DMDMS | MTBE | 30 | 10 | 21,800 | 97.0 | 6 |
| 11 | DBDMS | MTBE | 50 | 10 | 25,490 | 97.1 | 7.5 |
| 12 | CMDMS | THF | 70 | 10 | 19,630 | 96.5 | 8.0 |
| 13 | CMDMS | MTBE | 70 | 30 | 19,020 | 93.5 | 8.0 |
| 14 | CMDMS | MTBE | 70 | 60 | 18,860 | 91.8 | 9.6 |
| 15 | CMDMS | MTBE | 70 | 5 | 19,280 | 97.0 | 5.4 |
| 16 | CMDMS | — | 0 | 5 | 15,200 | 97.7 | 3.5 |
| 17 | CMDMS | — | 0 | 10 | 17,600 | 97.0 | 4 |
| 18 | CMDMS | — | 0 | 30 | 20,100 | 96.4 | 4 |
| 19 | CMDMS | — | 0 | 60 | 18,700 | 95.7 | 4 |
| 20 | DBDMS | — | 0 | 10 | 18,000 | 97.1 | 5 |
| 21 | — | DEE | 100 | 10 | 17,500 | 73.0 | 28 |
| 22 | — | THF | 100 | 10 | 14,300 | 65.0 | 45 |
| 23 | — | EDIA | 100 | 10 | 15,200 | 70.0 | 53 |

-continued

| Example | E1 | E2 | mol. % E2 | Al E₁ + E₂ | P | HI | MI |
|---|---|---|---|---|---|---|---|
| 24 | — | MTBE | 100 | 10 | 18,700 | 68.6 | 73 |
| 25 | — | ETBE | 100 | 10 | 16,000 | 72.0 | 65 |
| 26 | CMDMS | DPMMS | 30 | 10 | 23,000 | 96.5 | 7 |
| 27 | CMDMS | DPMMS | 70 | 10 | 22,000 | 95.7 | 9 |
| 28 | DBDMS | DPMMS | 30 | 10 | 22,700 | 96.8 | 6 |
| 29 | CMDMS | TMMS | 30 | 20 | 21,800 | 96.3 | 6 |
| 30 | CMDMS | TMMS | 70 | 20 | 22,400 | 95.9 | 8 |
| 31 | CMDMS | TMES | 70 | 20 | 21,000 | 96.0 | 5 |
| 32 | — | DPMMS | 100 | 10 | 17,000 | 72.0 | 15 |
| 33 | — | TMMS | 100 | 20 | 16,500 | 66.0 | 20 |
| 34 | — | TMES | 100 | 20 | 18,000 | 70.0 | 17 |

CMDMS = cyclohexylmethyldimethoxysilane
DEE = diethyl ether
TFH = tetrahydrofuran
ETBE = ethyltertiobutyl ether
TMMS = trimethylmethoxysilane
DBDMS = diisobutyldimethoxysilane
EDIA = diisoamyl ether
MTBE = methyltertiobutyl ether
DPMMS = diphenylmethylmethoxysilane
TMES = trimethylethoxysilane
P = productivity in grams of polymer per gram of catalyst While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A cocatalyst for use in association with a catalytic component comprising a titanium compound and an internal electron donor on a magnesium halide support for the polymerization of propylene alone or propylene with ethylene or a $C_4$ or $C_{12}$ alpha-olefin, said cocatalyst consisting essentially of an organic aluminum compound and an external electron donor consisting essentially of the combination of a hydrocarbyl monoether and/or a hydrocarbyl silane having a single Si—O—C bond with a non-aromatic saturated hydrocarbyl silane having two Si—O—C bonds.

2. The cocatalyst of claim 1, wherein the molar percentages are from 80 to 5 of monoether and/or of silane with a single Si—O—C bond for, correspondingly, 20 to 95 of silane with two Si—O—C bonds.

3. The cocatalyst of claim 2, wherein the molar ratio of the monoether and/or silane with a single SI—O—C bond+silane with two Si—O—C bonds to the aluminum of the cocatalyst is between 0.2 and 0.005.

4. The cocatalyst of claim 3, wherein the monoether is of the formula R'OR", in which R' and R" are identical or different, and are straight or branched chain hydrocarbon radicals containing from 1 to 10 carbon atoms, or cyclic radicals, with the oxygen forming a ring with at least 4 carbon atoms, but no more than 12 carbon atoms.

5. The cocatalyst of claim 4, wherein the silane with a single Si—O—C bond is the formula $R_1R_2R_3$Si—O—R, in which $R_1$, $R_2$, $R_3$ are identical or different, saturated or unsaturated, straight or branched chain hydrocarbon radicals containing from 1 to 12 carbon atoms and R is a methyl or ethyl radical.

6. The cocatalyst of claim 5, wherein the silane with two Si—O—C bonds is the formula $R_1R_2Si(OR)_2$ in which $R_1$ and $R_2$ are straight or branched chain saturated heteroation-free hydrocarbon radicals and contain from 1 to 12 carbon atoms, and R is a methyl or ethyl radical.

7. The cocatalyst of claim 1, wherein the molar percentages are from 80 to 5 of monoether and/or of silane with a single Si—O—C bond, correspondingly, 20 to 95 of silane with two Si—O—C bonds.

8. The cocatalyst of claim 7, wherein the molar ratio of the monoether and/or silane with a single Si—O—C+silane with two SI—O—C bonds to the aluminum of the cocatalyst is between 0.2 and 0.005.

9. The cocatalyst of claim 8, wherein the monoether is the formula R'OR", in which R' and R" are identical or different, and are straight or branched chain hydrocarbon radicals containing from 1 to 10 carbon atoms, or cyclic radicals, with the oxygen forming a ring with at least 4 carbon atoms, but no more than 12 carbon atoms.

10. The cocatalyst of claim 9, wherein the silane with a single Si—O—C bond is the formula $R_1R_2R_3$Si—O—, in which $R_1$, $R_2$, $R_3$ are identical or different, saturated or unsaturated, straight or branched chain hydrocarbon radicals containing from 1 to 12 carbon atoms and R is a methyl or ethyl radical.

11. The cocatalyst of claim 10, wherein the silane with two Si—O—C bonds is the formula $R_1R_2Si(OR)_2$ in which $R_1$ and $R_2$ are straight or branched chain saturated hetroatom-free hydrocarbon radicals and contain from 1 to 12 carbon atoms, and R is a methyl or ethyl radical.

12. A catalyst consisting essentially of a catalytic component comprising a titanium compound and an internal electron donor on a magnesium halide support and a cocatalyst, said cocatalyst being the cocatalyst of any one of claims 1 to 11.

13. The catalyst of claim 12, wherein said internal electron donor is an ester of a carboxylic acid.

14. The catalyst of claim 13, wherein said ester is an ester of maleic, fumaric, benzoic, methyacrylic, or phthalic acid.

15. The catalyst of claim 14, wherein the ester is dibutyl phthalate.

* * * * *